US012806813B2

(12) United States Patent
Rodionov et al.

(10) Patent No.: US 12,806,813 B2
(45) Date of Patent: Nov. 24, 2026

(54) FOOD SLICER DEVICE, SYSTEM AND METHOD

(71) Applicant: X ROBOTICS, INC., San Francisco, CA (US)

(72) Inventors: Denis Rodionov, San Francisco, CA (US); Roman Sharapov, San Francisco, CA (US)

(73) Assignee: X ROBOTICS, INC., San Francisco, CA (US)

( * ) Notice: Subject to any disclaimer, the term of this patent is extended or adjusted under 35 U.S.C. 154(b) by 654 days.

(21) Appl. No.: 18/324,571

(22) Filed: May 26, 2023

(65) Prior Publication Data

US 2023/0381995 A1 Nov. 30, 2023

Related U.S. Application Data

(63) Continuation-in-part of application No. 17/475,293, filed on Sep. 14, 2021, now Pat. No. 12,582,126.

(51) Int. Cl.
*B26D 7/06* (2006.01)
*B26D 1/26* (2006.01)

(52) U.S. Cl.
CPC ............. *B26D 7/0608* (2013.01); *B26D 1/26* (2013.01); *B26D 2210/06* (2013.01)

(58) Field of Classification Search
CPC ..... B26D 7/0608; B26D 1/26; B26D 2210/06
See application file for complete search history.

(56) References Cited

U.S. PATENT DOCUMENTS 3,513,477 A 5/1970 Hayashi
3,776,073 A * 12/1973 Runge .................. B26D 7/0608 83/241

(Continued)

FOREIGN PATENT DOCUMENTS

CN 103037697 A 4/2013
JP 2007020520 A 2/2007

(Continued)

OTHER PUBLICATIONS

PCT/US2020/052982, International Searching Authority, Notification of Transmittal of the International Search Report and the Written Opinion of the International Searching Authority, Notification Date Dec. 17, 2020.

(Continued)

*Primary Examiner* — Omar Flores Sanchez
(74) *Attorney, Agent, or Firm* — Franklin & Associates International Inc; Matthew F. Lambrinos

(57) ABSTRACT

A food slicer for slicing a food item, and including a plurality of tracks, and weight slidable associated along the tracks for advancing the food item toward a blade. A weight guide can engage with the weight, with a follower slidable in a track channel defined along a longitudinal length of the tracks. The tracks can be attached to a hub to form a radial arrangement, with a frame slidable along the tracks. The weight guide can include a clamp arm having an opening releasably engageable with a protrusion extending from the weight, a locking arm having a latch engageable with a ledge of the weight, and a piercing arm having a piercing end configured to pierce into the food item. The weight can include a locking recess configured to receive the locking arm, and piercing sections extending having a piercing element configured to pierce into the food item.

18 Claims, 11 Drawing Sheets

(56) References Cited

U.S. PATENT DOCUMENTS

| | | | |
|---|---|---|---|
| 3,851,554 A | 12/1974 | Papai | |
| 4,078,874 A | 3/1978 | Lenhardt, Sr. | |
| 4,463,643 A * | 8/1984 | Bettcher | B26D 7/0608 83/411.2 |
| 4,595,349 A | 6/1986 | Preston et al. | |
| RE32,592 E * | 2/1988 | Bettcher | B26D 7/0641 83/411.2 |
| 4,844,296 A | 7/1989 | Hayashi | |
| 5,215,771 A | 6/1993 | Callebaut et al. | |
| 5,217,108 A | 6/1993 | Newnan | |
| 5,997,924 A | 12/1999 | Olander, Jr. et al. | |
| 8,710,408 B2 | 4/2014 | Khatchadourian et al. | |
| 9,974,314 B2 * | 5/2018 | Fritz-Jung | B25J 11/00 |
| 10,792,818 B2 | 10/2020 | Fritz-Jung et al. | |
| 10,980,270 B2 | 4/2021 | Lindee et al. | |
| 11,685,641 B2 | 6/2023 | Lange et al. | |
| 2002/0176921 A1 | 11/2002 | Torghele | |
| 2003/0079595 A1 * | 5/2003 | Shariff | B26D 7/02 83/730 |
| 2010/0212516 A1 | 8/2010 | Westberg | |
| 2011/0209961 A1 | 9/2011 | Fritz-Jung | |
| 2011/0226101 A1 * | 9/2011 | Volkl | B26D 1/28 83/176 |
| 2013/0331989 A1 | 12/2013 | Umeno | |
| 2016/0067866 A1 | 3/2016 | Sekar et al. | |
| 2016/0157678 A1 * | 6/2016 | Chung | B26D 3/22 83/167 |
| 2017/0290345 A1 | 10/2017 | Garden et al. | |
| 2018/0075506 A1 | 3/2018 | Burkhard et al. | |
| 2020/0154754 A1 | 5/2020 | Lindee et al. | |
| 2020/0249660 A1 | 8/2020 | Rao | |
| 2021/0094188 A1 | 4/2021 | Rodionov | |
| 2021/0169091 A1 * | 6/2021 | Mayr | A22C 17/002 |
| 2021/0354325 A1 * | 11/2021 | Voelkl | B26D 7/30 |
| 2021/0354327 A1 * | 11/2021 | Mayr | B26D 7/0616 |
| 2022/0234769 A1 * | 7/2022 | Van Cauwenberghe | B65B 25/18 |
| 2022/0304318 A1 * | 9/2022 | Voelkl | A22C 17/0033 |
| 2023/0077697 A1 | 3/2023 | Robotics | |
| 2023/0240459 A1 | 8/2023 | Robotics | |
| 2023/0255225 A1 | 8/2023 | Robotics | |
| 2023/0330884 A1 * | 10/2023 | Kammer | B26D 7/0608 |
| 2024/0335969 A1 * | 10/2024 | Stachel | B26D 5/00 |

FOREIGN PATENT DOCUMENTS

| | | |
|---|---|---|
| JP | 2010007509 A | 1/2010 |
| WO | 2017101015 A1 | 6/2017 |
| WO | 2017134156 A1 | 8/2017 |
| WO | 2019070733 A1 | 4/2019 |
| WO | 2021062343 A1 | 4/2021 |
| WO | 2023043706 A1 | 3/2023 |
| WO | 2023196657 A1 | 10/2023 |
| WO | 2024227110 A1 | 10/2024 |

OTHER PUBLICATIONS

Written Opinion issued on Oct. 10, 2024 on International Patent Application PCT/US2024/026687, filed Apr. 26, 2024, in the name of X Robotics, Inc.

Written Opinion issued on Aug. 11, 2023 on International Patent Application PCT/US23/17976, filed Apr. 7, 2023, in the name of X Robotics, Inc.

Partial supplementary European search report dated Aug. 28, 2023 issued on European Patent Application No. 20868965.3, filed •Sep. 27, 2020 in the name of X Robotics Inc.

* cited by examiner

FOOD SLICER DEVICE, SYSTEM AND METHOD

CROSS-REFERENCE TO RELATED APPLICATION

This application is a continuation-in-part under 35 U.S.C. § 120 based upon co-pending U.S. patent application Ser. No. 17/475,293 filed on Sep. 14, 2021, the entire contents of which is incorporated herein by reference.

BACKGROUND

Technical Field

In some aspects, the present technology can relate to a food item delivering device for use in connection with providing a food item to a blade for slicing. In some other aspects, the present technology can relate to a food slicer including the food delivering device. In some yet other aspects, the present technology can relate to a food slicer device for use in connection with slicing a food item. In some other aspects, the present technology can relate to methods associated with a food delivering device. In some other aspects, the present technology can relate to methods associated with a food slicer. In yet other aspects, the present technology can relate to a dispenser system for slicing and providing a material ingredient to an automatic food processing machine. In some other aspects, the present technology relates to a material dispenser and/or method for preparing a food for cooking.

Background Description

Motorized and hand operated food slicers for slicing a food product are known. These known slicers are typically utilized for cutting a slice of a food. The slicers typically include a sliding carriage configured to hold a large portion of the food time and also to move an end of the food item across a moving or rotating blade. Sliding the carriage back and forth provides continuous slices of the food item. The rotation of the blade and/or movement of the carriage can be manually operated or motorized.

Many attempts have been executed to automatize restaurants. Most of it uses universal robotics in the process. For example, some known systems use robotic to move a pizza from dough press to ingredients dispenser and then to a carousel oven. However, these known robotic systems utilize inefficient, complex and high cost dispensers.

SUMMARY

In view of the foregoing disadvantages inherent in the known types of slicers at least some embodiments of the present technology provides a novel dismountable food slicer device, system and method, and overcomes one or more of the mentioned disadvantages and drawbacks of the prior art. As such, the general purpose of at least some embodiments of the present technology, which will be described subsequently in greater detail, is to provide a new and novel food slicer device, system and method which has all the advantages of the prior art mentioned herein and many novel features that result in a food slicer device, system and method which is not anticipated, rendered obvious, suggested, or even implied by the prior art, either alone or in any combination thereof.

According to one aspect, the present technology can include a food item delivering device for providing a food item to a blade. The food item delivering device can include one or more tracks, and a weight slidable along the tracks. The food item can be in contact with the weight for advancing the food item toward the blade.

According to another aspect, the present technology can include a food slicer for slicing a food item by a blade. The food slicer can include a plurality of tracks, a weight, a hub, and a frame. The plurality of tracks can each include a track channel defined along a longitudinal length of the tracks. The weight advances the food item toward the blade, with the food item being secured to the weight. The hub can have each of the tracks attachable thereto to form a radial arrangement of the tracks with the hub located interior thereof. The frame can be slidable along the tracks. The frame can include a base and an upper member. The base can include base bores defined therethrough so that each of the base bores is aligned with at least one of the tracks. The upper member can include upper arms extending out from a central ring in a radial arrangement so that each of the upper arms extends out from between the tracks adjacent to each other.

According to yet another aspect, the present technology can include a food slicer system for slicing a food item. The food slicer system can include a plurality of tracks, a blade, a weight, a hub and a frame. The plurality of tracks can each include a track channel defined along a longitudinal length of the tracks. The weight can have the food item secured thereto, and the weight can advance the food item toward the blade. The hub can have each of the tracks attachable thereto to form a radial arrangement of the tracks with the hub located interior thereof. The frame can be slidable along the tracks. The frame can include a base and an upper member. The base can include base bores defined therethrough so that each of the base bores is aligned with at least one of the tracks. The upper member can include upper arms extending out from a central ring in a radial arrangement so that each of the upper arms extends out from between the tracks adjacent to each other.

According to still yet another aspect, the present technology can include a method of operating a food item delivering device for providing a food item to a blade. The food item delivering device can include one or more tracks, and a weight. The method can include the steps of securing the food item to the weight. Sliding the weight and the food item along one of the tracks so that the weight advances the food item toward the blade. Slicing a section of the food item by the blade.

Some embodiments of the present technology can include a weight guide engageable with the weight. The weight guide can include a follower slidable received in a track channel defined along a longitudinal length of the tracks.

In some embodiments, the weight guide can include a clamp arm including a first opening releasably engageable with a protrusion extending from the weight.

In some embodiments, the weight guide can include a locking arm including a latch engageable with a ledge of the weight.

In some embodiments, the weight guide can include a piercing arm including a piercing end configured to pierce into the food item.

In some embodiments, the weight can include a locking recess defined in the weight and configured to receive the locking arm. The ledge can be adjacent to the locking recess.

In some embodiments, the weight can include one or more piercing sections extending from the weight. The piercing sections can include a piercing element configured to pierce into the food item.

Some embodiments of the present technology can include a track support including a plurality of support arms. The tracks can be a plurality of tracks secured to the track support in a radial arrangement.

Some embodiments of the present technology can include a hub. The tracks can be a plurality of tracks secured to the hub in a radial arrangement.

Some embodiments of the present technology can include a coupler.

In some embodiments, the coupler can include a tapered body.

In some embodiments, the tapered body can include coupler teeth.

In some embodiments, the hub can include a tapered bore defined therein including hub teeth. The tapered body of the coupler can be receivable in the tapered bore of the hub so that the coupler teeth and the hub teeth are engageable.

Some embodiments of the present technology can include a frame slidable associated with the tracks.

In some embodiments, the frame can include a base including base bores defined through the base in a radial arrangement so that each of the base bores is aligned with at least one of the tracks. The base bores can be configured receive the food item therethrough.

In some embodiments, the frame can include an upper member including upper arms extending out from a central ring in a radial arrangement so that each of the upper arms extends out from between the tracks adjacent to each other.

In some embodiments, the frame can include a handle attachable to one or more of the upper arms and the base.

In some embodiments, the base can include one or more guide ramps extending into the base bores. The guide ramps can be configured to guide the food item through the base bores.

In some embodiments, the base bores can be configured to receive the weight therethrough.

In some embodiments, the base can include a base central bore defined therethrough that is configured to receive the hub.

In some embodiments, the frame can be configured to slide along the tracks.

In some embodiments, the blade can be a rotating blade.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel food slicer device, system and method that has all of the advantages of the prior art slicers and none of the disadvantages.

It is another object of the present technology to provide a new and novel food slicer device, system and method that may be easily and efficiently manufactured and marketed.

An even further object of the present technology is to provide a new and novel food slicer device, system and method that has a low cost of manufacture with regard to both materials and labor, and which accordingly is then susceptible of low prices of sale to the consuming public, thereby making such food slicer device, system and method economically available to the buying public.

Still another object of the present technology is to provide a new food slicer device, system and method that provides in the apparatuses and methods of the prior art some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

BRIEF DESCRIPTION OF THE DRAWINGS

The present technology will be better understood and objects other than those set forth above will become apparent when consideration is given to the following detailed description thereof. Such description makes reference to the annexed drawings, with the phantom lines depicting environmental structure and forming no part of the claimed present technology, wherein:

The same reference numerals refer to the same parts throughout the various figures.

DETAILED DESCRIPTION OF THE EMBODIMENTS

Figure 1:
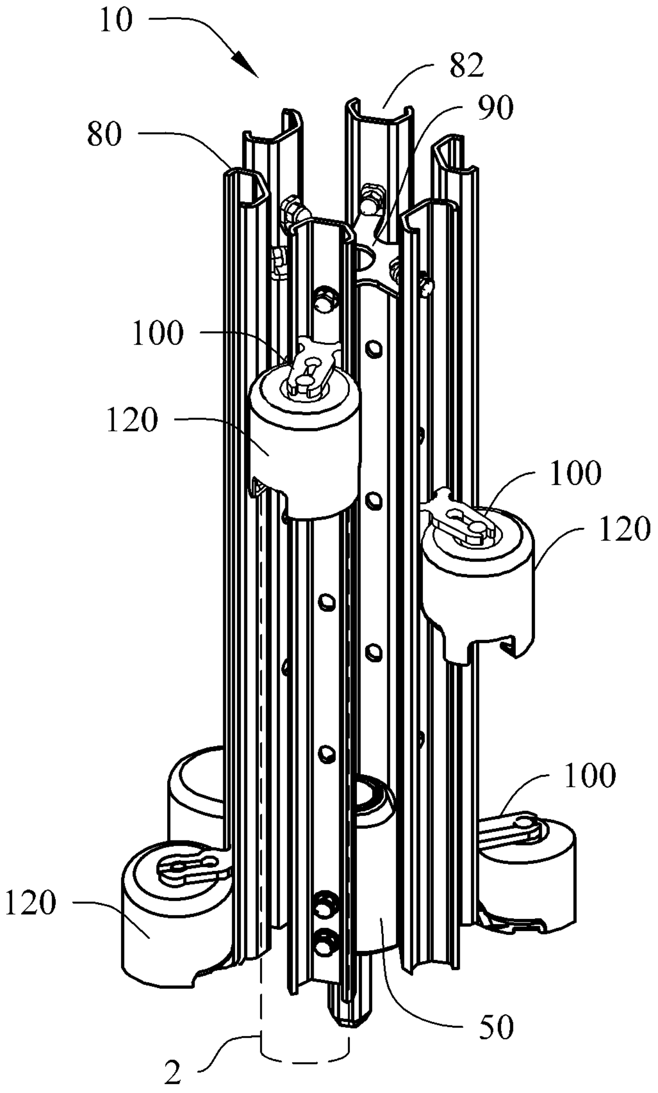
FIG. 1 is a perspective view of an embodiment of the food item delivery device constructed in accordance with the principles of the present technology.

Apart from the cumbersomeness of known slicers, they are not easily capable of being disassembled for cleaning and/or repair, and they are not configured to provide effective slicing of food. If left uncleaned for a period of time, a foodstuff, such as pepperoni, in the carriage can begin to grow bacteria. Continued operation would then transfer the bacteria to a food item and thereafter eaten by the consumer. This causes an extremely dangerous health risk.

Furthermore, these known slicers may have the ability to not provide a multiple supply of the food item to the cutting blade, thereby requiring user interaction to continuously reload the carriage with replacement a food item. Still further, these known slicers typically require the weight of the food item to move the food item toward the cutting blade. This can cause irregular slice thickness when not much of the food item remains, and which can further cause the remaining food item to be lodged into any gaps between the carriage a cutting frame or with the blade. Any remaining food item lodged in these gaps or in the blade can cause a significant health concern.

The USDA says food that has been left out of the fridge for more than two hours should be thrown away. Consequently, these known food dispensers should be disassembled and cleaned every couple of hours. Further, it can take considerable time to disassembly these known pump dispensers for cleaning, which leads to down time of the food preparation machine causing loss of revenue.

While the above-described devices fulfill their respective, particular objectives and requirements, the aforementioned devices or systems do not describe a food slicer device, system and method that allows slicing a food item. The present technology additionally overcomes one or more of the disadvantages associated with the known slicers.

A need exists for a new and novel food slicer device, system and method that can be used for slicing a food item. In this regard, the present technology substantially fulfills this need. In this respect, the food slicer device, system and method according to the present technology substantially departs from the conventional concepts and designs of the prior art, and in doing so provides an apparatus primarily developed for the purpose of slicing a food item.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

Referring now to the drawings, and particularly to FIGS. 1-21, an embodiment of the food item delivering device for a food slicer or a food slicer device or system of the present technology is shown and generally designated by the reference numeral 10.

In an embodiment, a food item delivering device or a food slicer 10 is provided according to some aspects of the present technology for providing a food item 2 for slicing and/or slicing a food item 2. In the exemplary, the food item 2 can be, but not limited to, a foodstuff, sausages, olives, salami, mushrooms, pickles, cucumbers, carrots, shallots, onions, garlic, tomatoes, cheese, pepperoni, and any cylindrical-like food item.

Any part of the food item delivering device or the food slicer 10 can be made from any suitable material, and can be a food grade or food safe material.

Referring to FIG. 1, an embodiment of the food item delivering device 10 for a food slicer of the present technology can include one or more tracks 80, and a weight 120 slidable along one of the tracks 80. The weights 120 can be configured to force or move a food item 2 toward a blade, thereby slicing the food item 2. A hub 50 can be utilized to secure the tracks 80 in a radial arrangement. A weight guide 100 can be attachable to the weights 120 for sliding the weights 120 along the tracks 80.

In FIGS. 2-5, an embodiment food slicer device and system 10 of the present technology for slicing a food item is illustrated and will be described. More particularly, the food slicer device 10 can include a frame 12, one or more tracks 80, and a weight 120 slidable along one of the tracks 80. The weight 120 can be configured to force or move a food item 2 toward a blade, thereby slicing the food item 2.

The tracks can be a plurality of tracks 80 arranged in a radial configuration with each track 80 including the weight 120.

Figure 8:
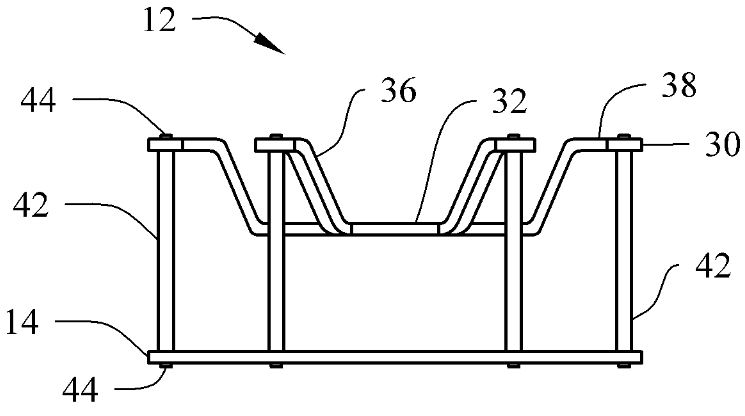
FIG. 8 is a side plane view of the assembled frame of the food slicer of FIG. 2.
Figure 10:
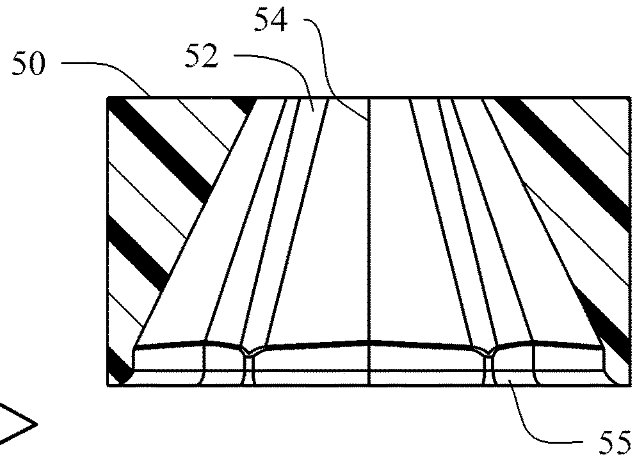
FIG. 10 is a cross-sectional view of the hub taken along line 10-10 in FIG. 9.

The frame 12 can include a base 14, an upper member 30 and one or more handles 42, as best illustrated in FIG. 8. The frame 12 can be slidable associated with the tracks 80 allowing for the food slicer 10 to be carried and moved without touching the food item 2 or having the food item 2 touch any surfaces.

Figure 2:
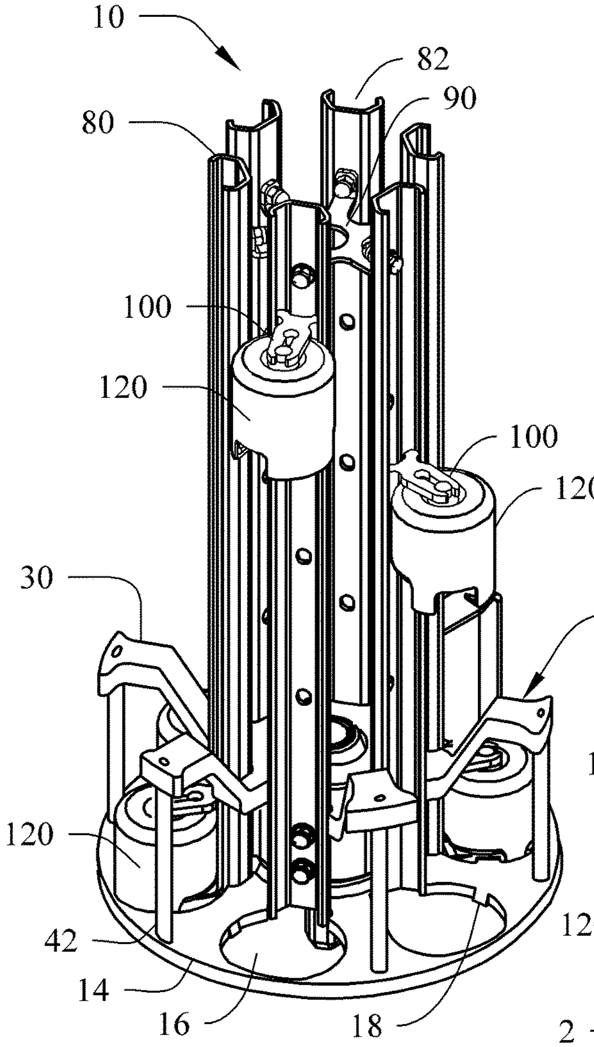
FIG. 2 is a perspective view of an embodiment of the food slicer device including the food item delivering device of FIG. 1 and the frame.
Figure 5:
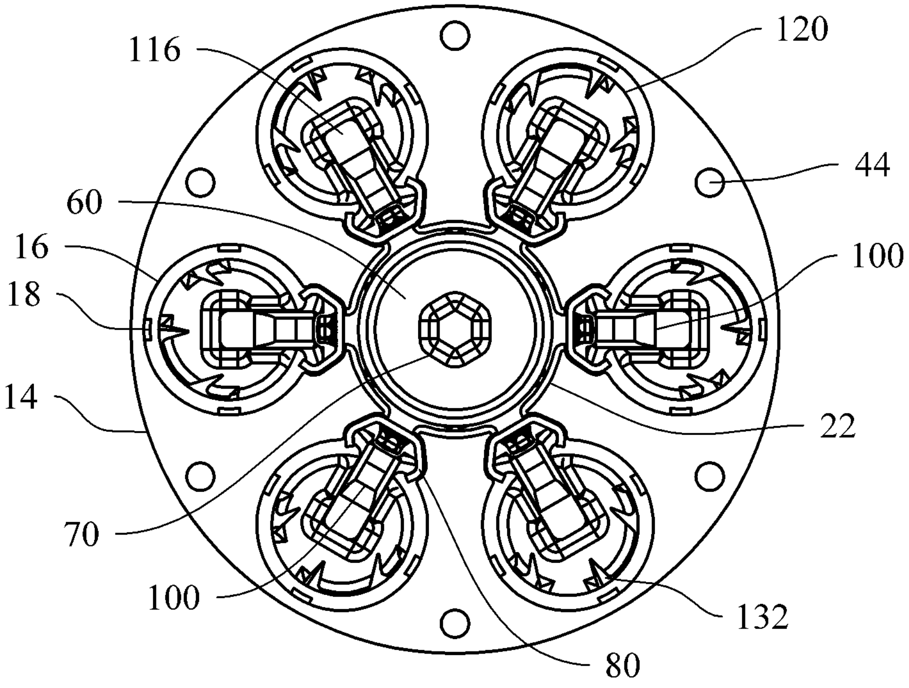
FIG. 5 is a bottom elevational view of the food slicer of FIG. 2.
Figure 6:
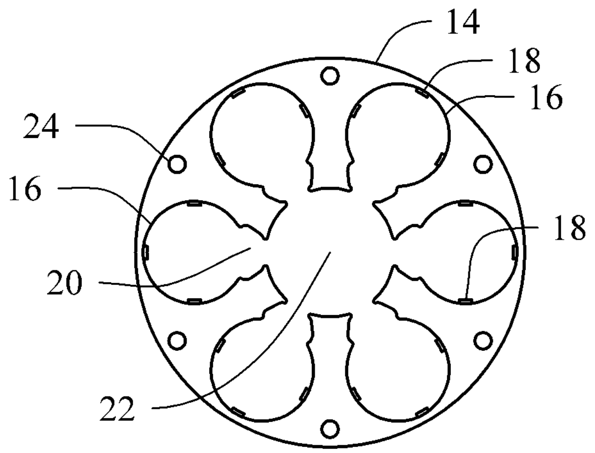
FIG. 6 is a top elevational view of the base of the food slicer of FIG. 2.
Figure 7:
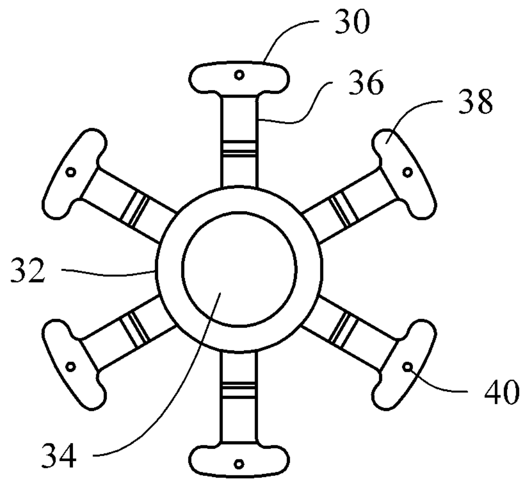
FIG. 7 is a top elevational view of the upper member of the food slicer of FIG. 2.

The base 14 can be a planar member featuring a plurality of base bores 16 defined therethrough in a radial array, as best illustrated in FIGS. 2, 5 and 6. The base bores 16 can each be configured to receive therethrough the food item 2 provided by the weight 120. include one more guide ramps 18 configured to guide the food item 2 through the base bore 16 and/or align the food item with the base bore 16.

A track opening 20 is defined through the base 14 and is in communication with each of the base bores 16. The track opening 20 is configured to slidable receive therein one of the tracks 80. Accordingly, the tracks 80 can be received in the track openings 20 so that the tracks 80 are further in communication with the base bores 16.

A base central bore 22 can be defined through the base 14, that is in communication with each of the track openings 20. In an embodiment, the base bores 16 and its corresponding track opening 20 can be radially arranged about the base central bore 22.

Referring to FIGS. 2, 3, 7 and 8, the upper member 30 can include a central ring 32 including a ring bore 34 centrally defined therethrough. Radially extending from the central ring 32 can be a plurality of upper arms 36. The upper arms 36 can extend from the central ring 32 at an angle away from the base 14 when the frame 12 is assembled. An arm end 38 can be of each of the upper arms 36 can be parallel with the base 14 and can include a handle bore 40.

A fastener 44 can be utilized to secure each of the handles 42 to the base 14 by way of radially arranged handle bores 24. Fasteners 44 can further be utilized to secure an opposite end of the handles 42 to the upper member 30 by way of handle bores 40 defined through each of the arm ends 38.

When the frame 12 is assembled, an open space defined between each of the upper arms 36 is aligned with each of the base bores 16. This configuration allows for the weights 120 to pass between each of the upper arms 36 and into their corresponding base bore 16 of the base 14.

Figure 9:
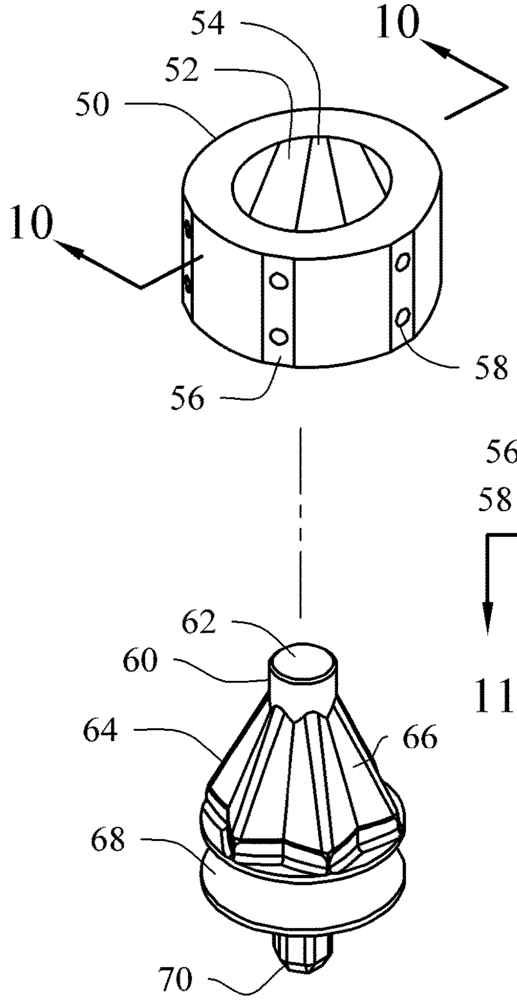
FIG. 9 is an exploded perspective view of the hub and the coupler of the food slicer of FIG. 2.
Figure 11:
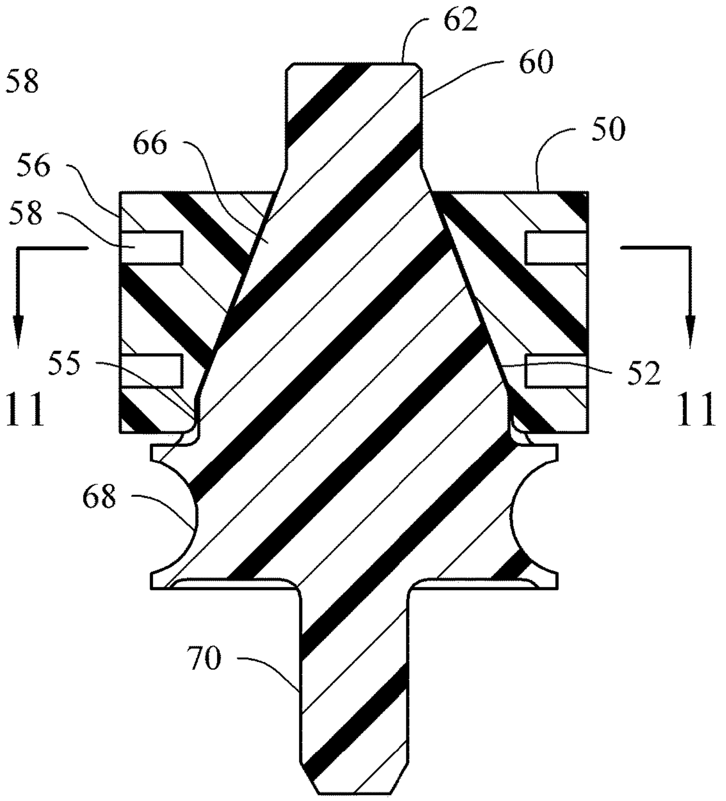
FIG. 11 is a cross-sectional view of the coupler assembled with the hub of FIG. 9.

Referring to FIGS. 9-12, an embodiment of the present technology can include a hub 50 for securing the tracks 80 is a radial configuration, and a coupler 60 engageable with the hub 50, as best illustrated in FIGS. 9 and 11. The hub 50 can include a generally cylindrical body with a tapered bore 52 defined therethrough. The tapered bore 52 can include one or more hub teeth 54 extending out from an interior surface of the hub 50 that defines the tapered bore 52. The tapered bore 52 and the hub teeth 54 can create a cog socket configured to receive a portion of the coupler 60.

One end of the hub 50 can include an entry opening 55 in communication with the tapered bore 52 for receiving a portion of the coupler 60.

Radially arranged on an exterior surface of the hub 50 can be one or more hub flat surfaces 56 configured to contact a corresponding track flat surface 81 (see FIG. 13) of the track 80. One or more threaded bores 58 can be defined into each of the hub flat surfaces 56. The hub flat surfaces 56 vertically support and align the tracks 80 in a radially configuration so that each of the tracks 80 can be slidably received in one of the track openings 20 of the upper member 30.

Figure 3:
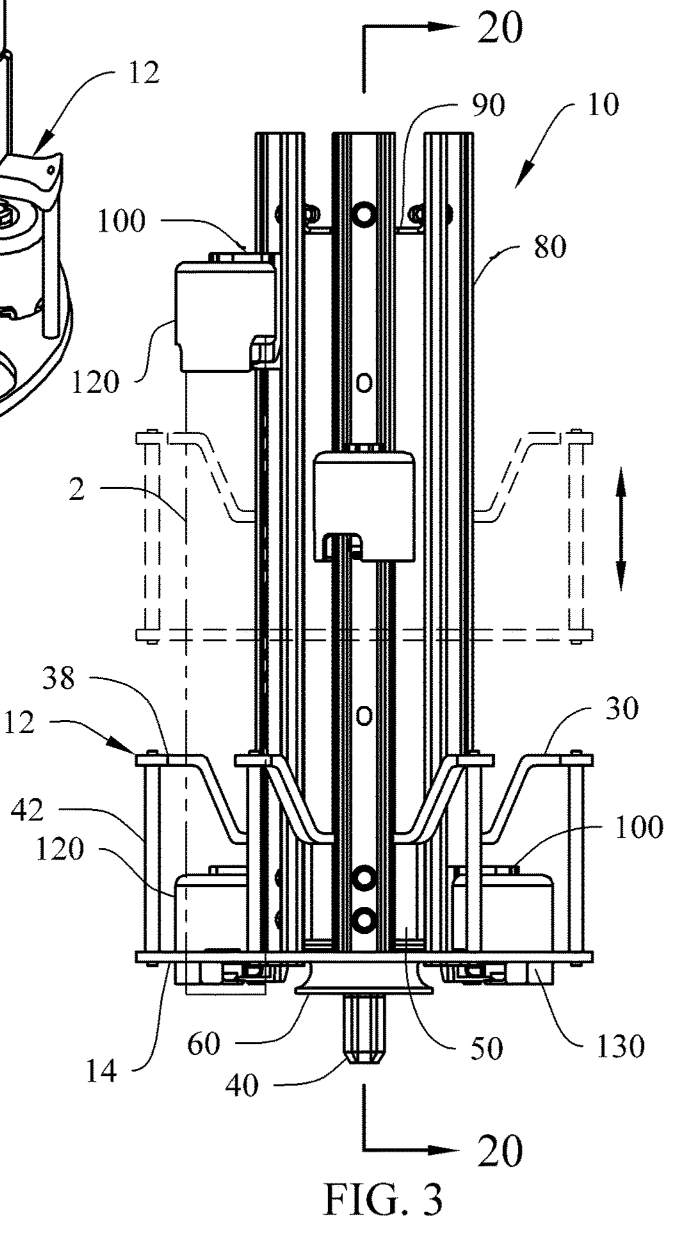
FIG. 3 is a front plane view of the food slicer of FIG. 2 with the frame moved to an alternate position.
Figure 4:
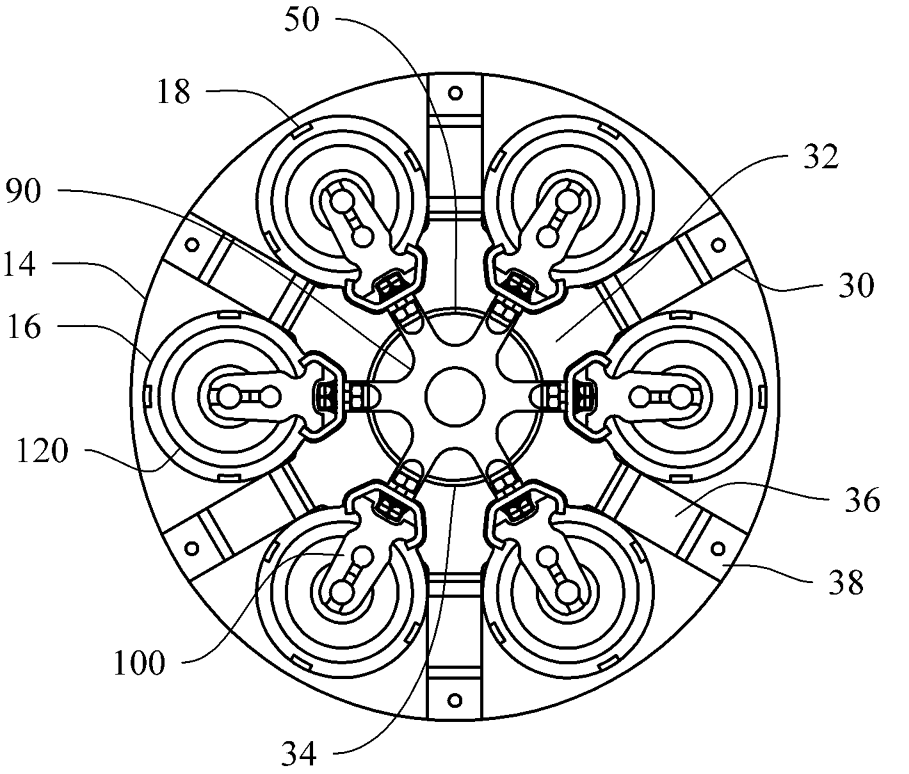
FIG. 4 is a top elevation view of the food slicer of FIG. 2.

The hub 50 can be configured to be receivable in the base central bore 22 of the base 14, thereby allowing the frame 12 slide along the tracks 80, as best illustrated in FIG. 3.

Figure 12:
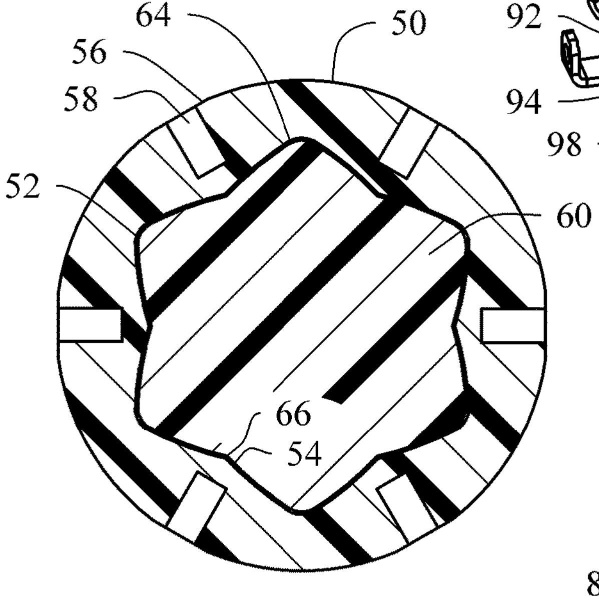
FIG. 12 is a cross-sectional view of the coupler assembled with the hub taken along line 12-12 in FIG. 11.

The coupler 60 can include a first end 62 configured to pass through the entry opening 55 and the tapered bore 52 of the hub. A tapered body 64 can be utilized that converges toward the first end 62, and which can include one or more coupler teeth 66. The tapered body 64 and the coupler teeth 66 can create a cog configured to be received in and engage with the tapered bore 52 and the hub teeth 54 of the hub 50, as best illustrated in FIG. 12. This arrangement allows for the transfer of rotation from the coupler 60 to the hub 50, and consequently to the tracks 80, the weights 120 associated and the frame 12 associated with the tracks.

In an embodiment, a flanged portion 68 can be associated with an end of the tapered body 64 opposite the first end 62. The flanged portion 68 can have a width or diameter greater than the tapered body 64, thereby creating a support ledge or rest for preventing the coupler 60 from entirely passing through the tapered bore 52. A sprocket end 70 of the coupler 60 can extend from the flanged portion 68, and can include a sprocket or teeth or configuration. The sprocket end 70 can be engageable or operatively associated with a coupler clutch, gearbox and/or motor 8 (see FIG. 21) to provide rotation of the coupler 60.

In an embodiment, the hub 50 and coupler 60 can be formed as an integral unit so that it includes the hub body, the hub flat surfaces 56 and threaded bores 58, and the sprocket end 70.

Figure 13:
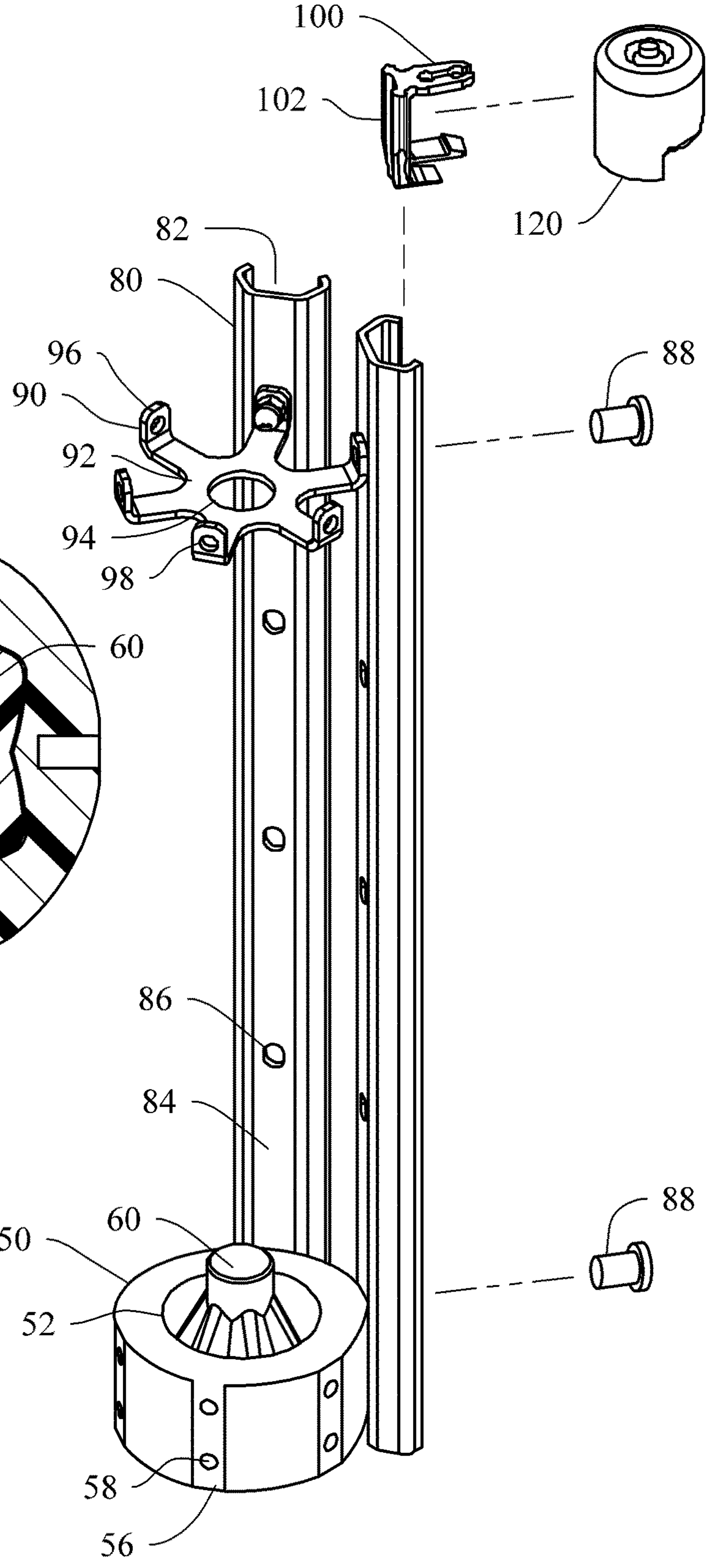
FIG. 13 is a perspective view of the track guides attached to the hub and the track upper support with the weight guide and weight exploded.

Referring to FIG. 13, each of the tracks 80 can be secured to one of the hub flat surfaces 56 and secured in place by a fastener 88. The tracks 80 can include one or more mounting holes 86 defined through the track flat surface 84 at one or more locations. Each track 80 can have, but not limited to, a generally C-shaped configuration that defines a track channel 82 along its longitudinal length capable of slidably receiving a follower 102 of a weight guide 100. It can be appreciated that any configuration of the track 80 can be utilized that defines the track channel 82 capable of slidably receiving the follower 102 along the longitudinal length of the track 80 while preventing lateral withdrawal of the weight guide 100 from the track 80. In an embodiment, the follower 102 can be made of, but not limited to, nylon or any low friction material.

In an embodiment, a track support 90 can be utilized near an end of the tracks 80 opposite the hub 50. The track support 90 can include a support ring 92 featuring a central bore 94 defined therethrough, and one or more support arms 96 radially extending from the support ring 92 Each support arm 96 can include a flanged end 98 featuring a track bore.

It can be appreciated that the track support 90 can be placed inside the radial array of tracks 80, with each of the bores of the flanged end 98 being aligned with one of the mounting holes 86 each of the tracks 80. A fastener 88 can be utilized to pass through the mounting holes 86 and either secured to the flanged end bore 98 via a thread arrangement or to pass through the flanged end bore 98 and secured by a fastener nut.

When assembled, each of the tracks 80 are secured to one of the hub flat surfaces 56 by way of the fastener 88 and the threaded bores 58. Further, each of the tracks 80 are further secured to one of the flanged ends 98 of the track support 90 by way of the fastener 88. In this exemplary arrangement, the tracks 80 are radially exterior of the hub 50 and the track support 90, with the central ring 32 of the upper member 30 being slidable received interior of the tracks 80 and between the hub 50 and the track support 90. The ring bore 34 of the upper member 30 can be further capable of receiving therethrough the first end 62 of the coupler 60, so that the upper member 30 can abut against or rest on an open end side of the hub 50.

Figure 14:
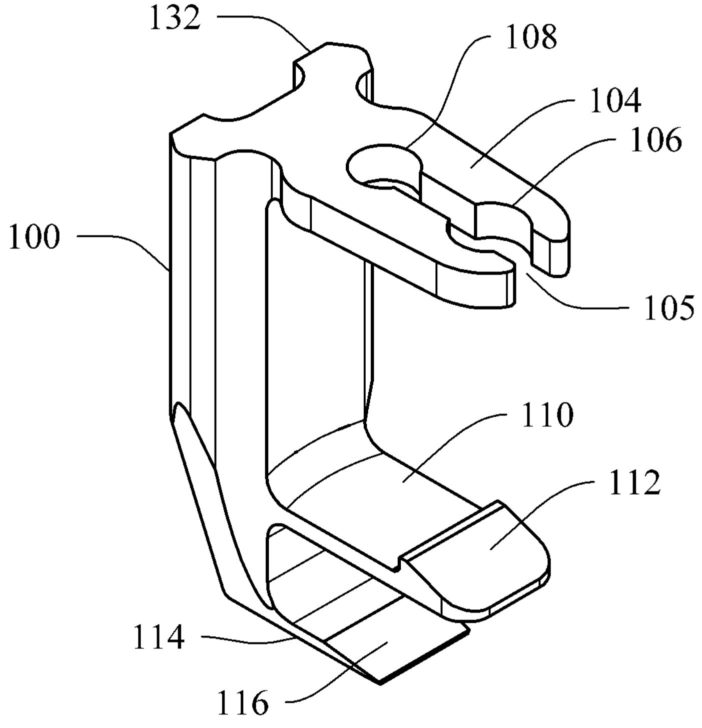
FIG. 14 is a perspective view of the weight guide.
Figure 15:
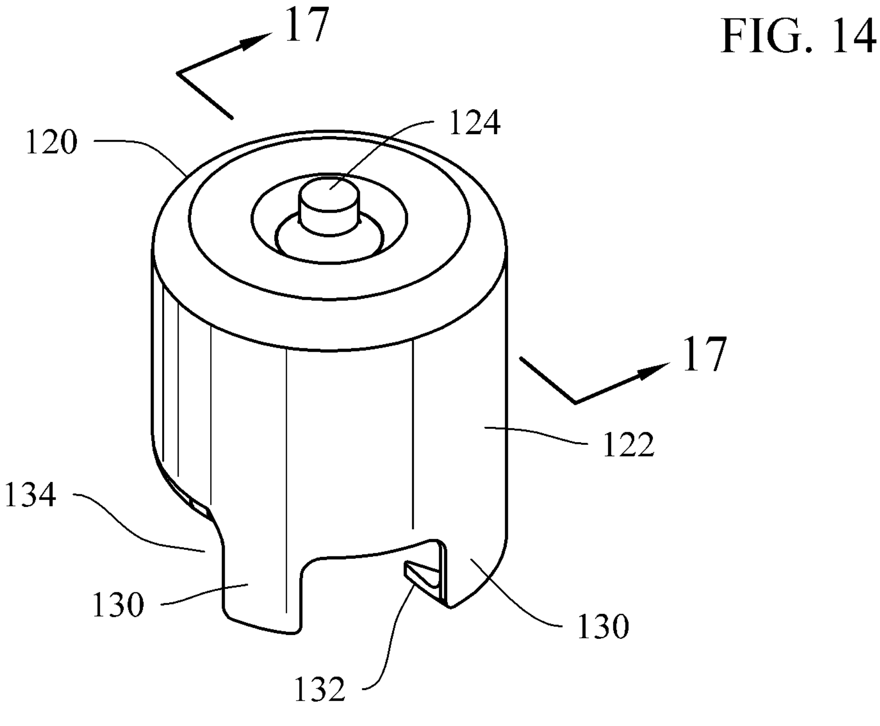
FIG. 15 is a top perspective view of the weight.
Figure 16:
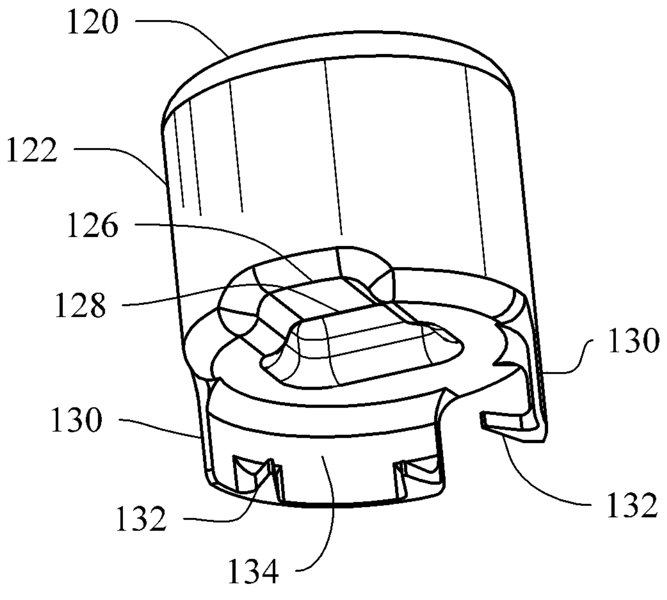
FIG. 16 is a bottom perspective view of the weight.
Figure 17:
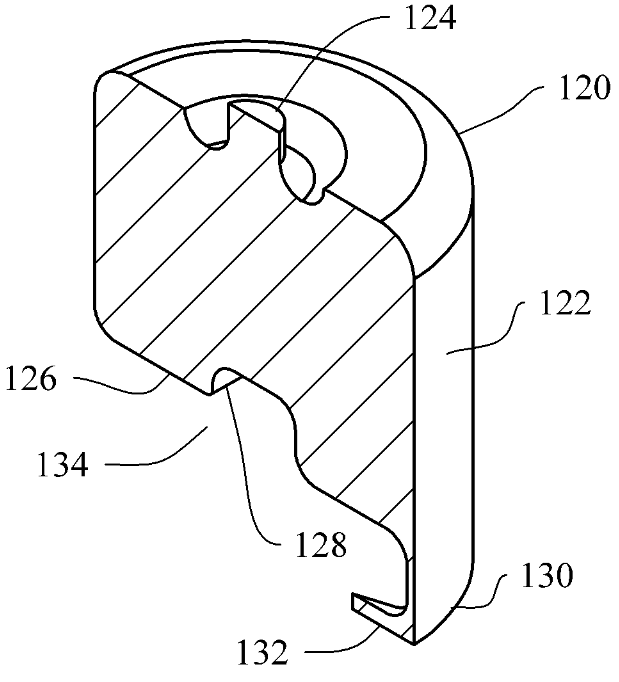
FIG. 17 is a cross-sectional view of the weight taken along line 17-17 in FIG. 15.
Figure 18:
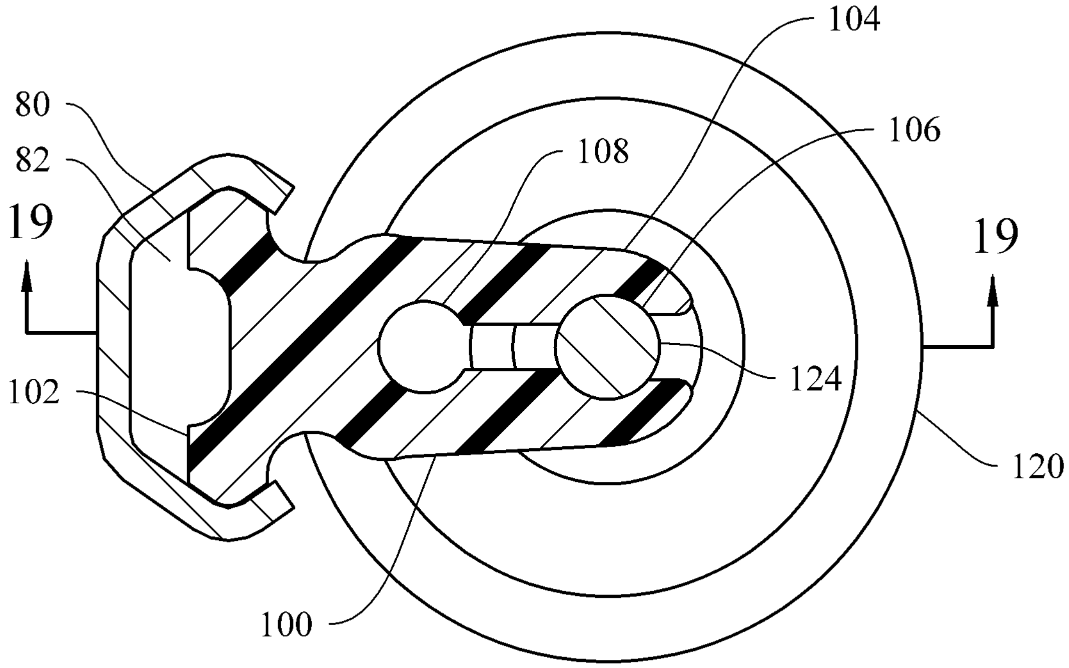
FIG. 18 is a cross-sectional view of the clamp arm of the weight guide and the protrusion of the weight engaged in the first opening of the clamp arm.
Figure 19:
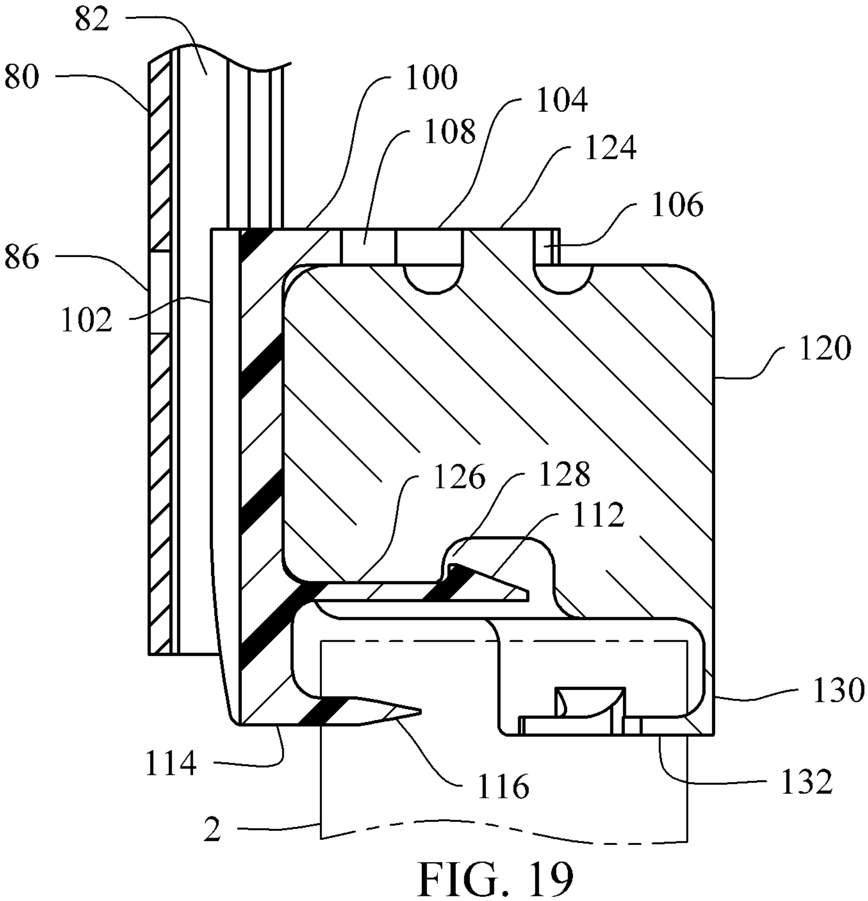
FIG. 19 is a cross-sectional view of the weight guide assembled with the weight and received in the track channel of the track.

Referring to FIG. 14, the weight guide 100 can include the follower 102, a clamp arm 104, a locking arm 110 and a piercing arm 114. The follower 102 can have a configurable capable of being slidably raceable in the track channel 82, and can run at least along a portion of a longitudinal length of the weight guide 100.

The clamp arm 104 can extend from a first end of the weight guide 100, and can include a slot 105 defined through the clamp arm 104 along a portion of its length. A first opening 106 is defined in the slot 105 having a width or diameter greater than a width of the slot 105, and a second opening 108 offset from the first opening 106 and have a width or diameter greater than the slot 105 and less than the first opening 106. The first opening 106 is configured to snap onto and receive a protrusion 124 (see FIG. 18) extending from a first side of the weight 120. The second opening 108 can be configured to receive a second protrusion sized differently to that of the protrusion 124, and/or to provide biased flexibility of the clamp arm 104 so that its open end defined by the slot 105 can separate sufficiently to allow the protrusion 124 to pass through the slot 105 and into the first opening 106. The clamp arm 104 can then bias back to or close to its original shape, thereby clamping the protrusion 124 in the first opening 106.

The locking arm 110 can extend from the weight guide 100 offset from the clamp arm 104 in a spaced apart relationship with the clamp arm 104. The locking arm 110 includes a latch end 112 configured to engage with a bottom portion of the weight 120.

The piercing arm 114 can extend from a second end of the weight guide 100 that is opposite from the first end. The piercing arm 114 can include a piercing end 116 configured to impale or pierce into the food item 2 (see FIG. 19).

Referring to FIGS. 15-19, the weight 120 can include a weight body 122, the protrusion 124 extending from a first end or side of the weight body 122, a locking recess 126, and one or more piercing sections 130 extending from a second or side of the weight body 122 opposite of the first end or side. The protrusion 124 can extend away from the first end or side so that is receivable in the slot 105 and the first opening 106 or the second opening 108.

The locking recess 126 can be defined in the second end or side and can be configured to receive the locking arm 110 of the weight guide 100. Insertion of the locking arm 110 into the locking recess 126 may flex the locking arm 110 so that the latch 112 can pass over the locking recess 126. A locking ledge 128 can be defined by a further recess in the second end or side, which is engageable by the latch 112.

The piercing sections 130 can extend from the second end or side so as to create an open area 134 capable of slidable receiving an end of the food item 2. Each piercing section 130 can include a piercing element 132 laterally extending into the open area 134.

In an exemplary operation, an end of the food item 2 can be inserted into the open area 134 so that it is impaled by the piercing elements 132. After which, the weight 120 and the attached food item 2 can be inserted into the open space of the weight guide 100 between the clamp arm 104 and the locking arm 110. Insertion of the weight 120 introduces the protrusion 124 into the slot 105 until received in the first opening 106, and further inserts the locking arm 110 of the weight guide 100 into the locking recess 126 of the weight 120 until the latch 112 passes over and engages with the ledge 128. This secures the weight 120 to the weight guide 100.

Securing the weight 120 to the weight guide 100 further impales the piercing end 116 of the piercing arm 114 of the weight guide 100 into the end of the food item 2 on a side of the food item opposite that of the piercing elements 132, thereby clamping the food item 2 in the open area 134 of the weight 120.

It can be appreciated that any movement of the weight guide 100 along the track imparts a corresponding movement to the weight 120 and the food item 2 secured thereto.

Figure 20:
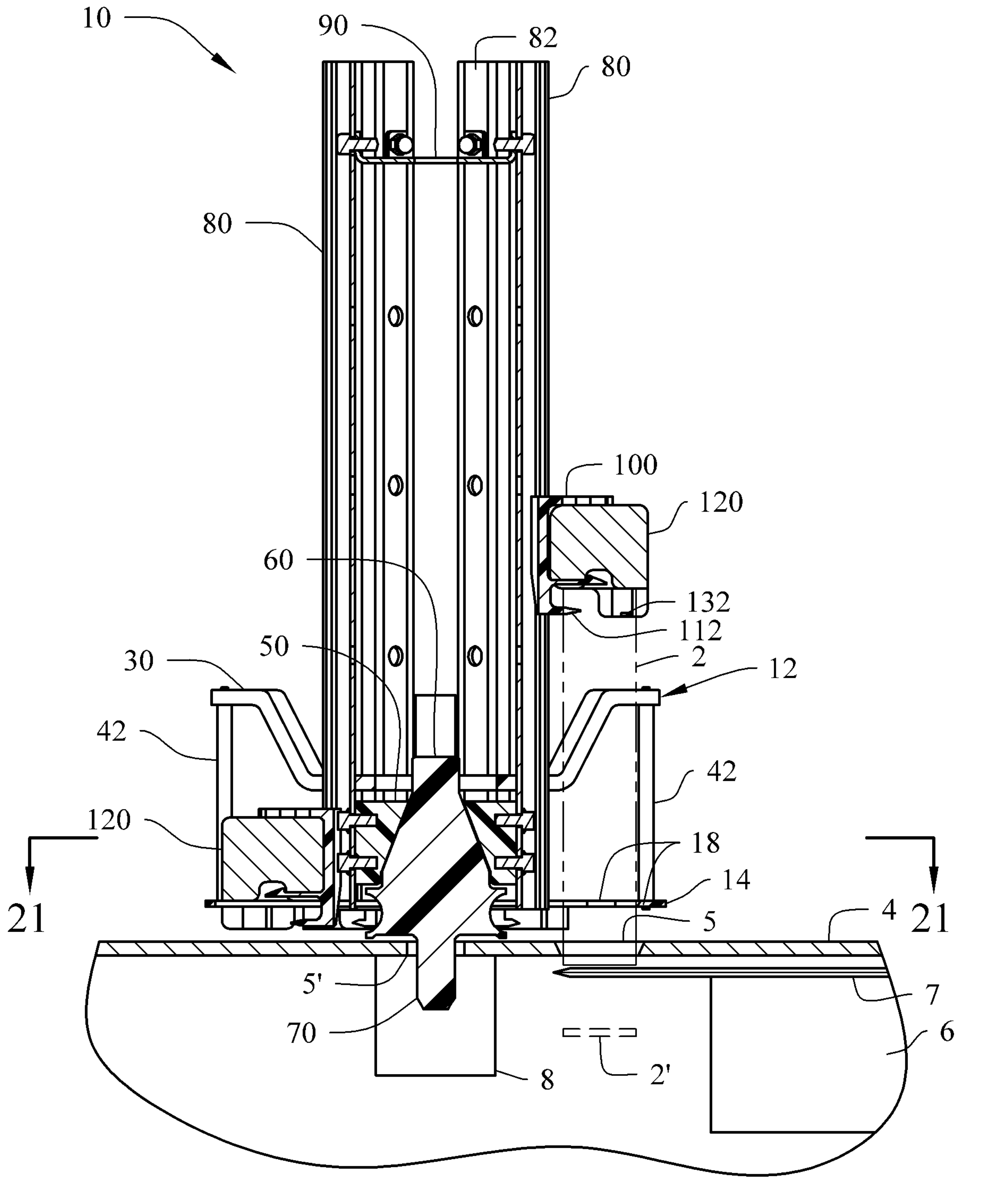
FIG. 20 is a cross-sectional view of the food slicer taken along line 20-20 in FIG. 2.
Figure 21:
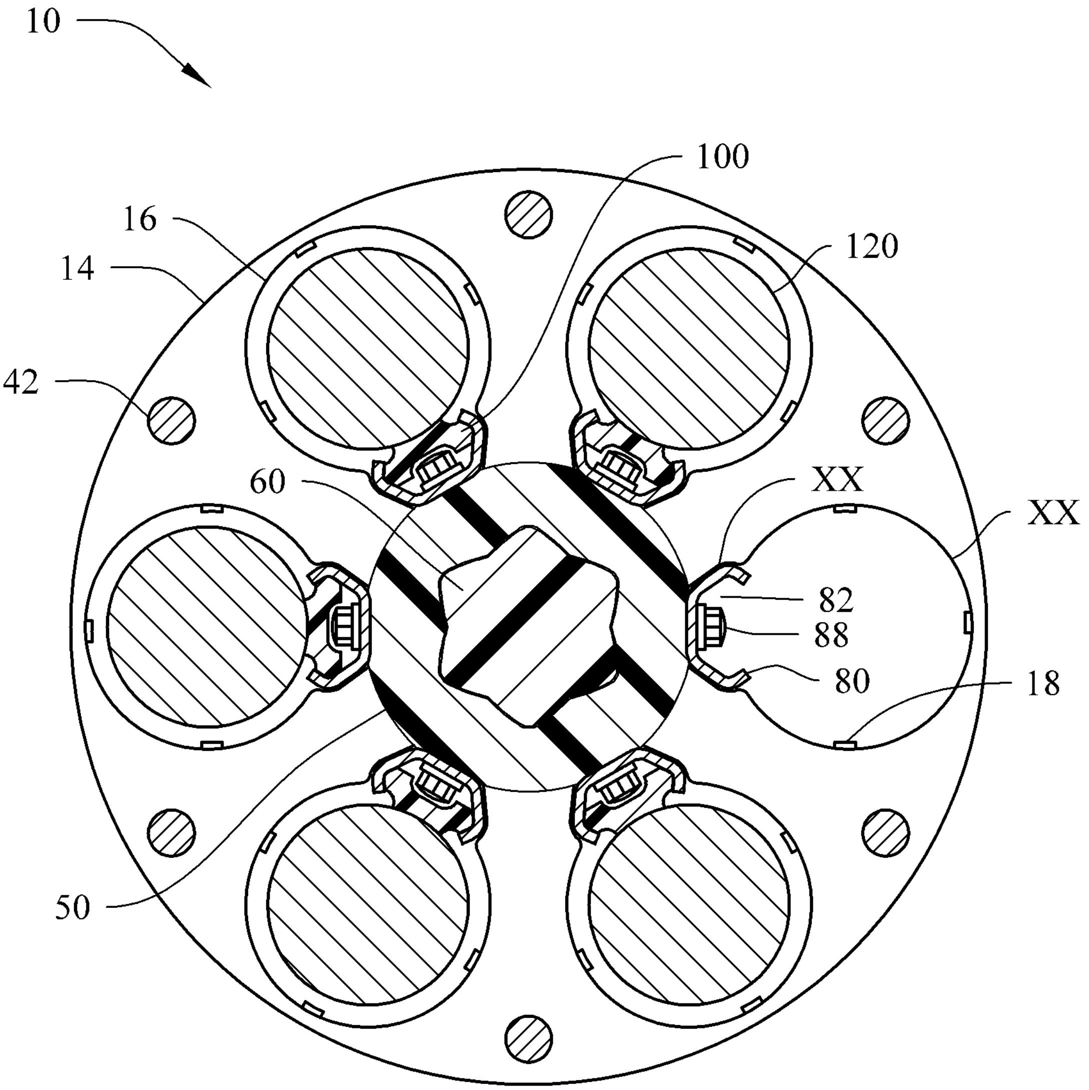
FIG. 21 is a cross-sectional view of the food slicer taken along line 21-21 in FIG. 20.

FIGS. 20 and 21 illustrates the food slicer 10 as assembled and in an exemplary operation. When the base 14 is supported on a surface 4, the tracks 80 are generally in a vertical orientation, and the sprocket end 70 of the coupler is receivable in a sprocket bore 5' defined through the surface 4. The coupler 60 can be operatively driven by a coupler clutch, gearbox and/or motor 8.

A food item 2 can be clamped to the weight guide 100 and the weight 120 as described above, and then the follower 102 can be inserted into the track channel 82 at its open free end. Each track 80 can receives its own weight guide 100, weight 120 and food item 2 clamped thereto. It can be appreciated that the weight guide 100 and the weight 120 can be removed from the tracks 80 and cleaned and/or replenished with a food item 2. After which, the assembled weight guide 100, weight 120 and clamped food item 2 can be slid along the track 80.

At one time, one of the base bores 16 of the base 14 is aligned with a food item bore 5 defined through the surface 4 so that the food item 2 passes through the food item bore 5 toward a blade 7 operatively driven by a blade clutch, gearbox and/or motor 6. The blade 7 can be a reciprocating or rotating blade. A size of the cutting opening or a distance between the food item 2 and the blade 7 can be adjusted thereby controlling the thickness of the sliced food item 2'.

Operation of the blade 7 slices a predetermined thickness 2' of the food item 2 so that it falls for application or dispensing. The weight 120 also pushes the food item 2 through the food item bore 2 toward the blade 7 for continuous slicing of the food item 2. Further, the weights 120 push the food items 2 through the base bores 16 and toward the surface 4.

Operation of the coupler motor 8 rotates the entire food slicer 10 to advance the next track 80 including the assembled weight guide 100, weight 120 and food item 2 into position over the food item bore 5 for slicing by the blade 7.

The piercing end 116 and/or the piercing elements 132 can be configured to impale or hold the food item 2 in the open area 134 of the weight 120. This allows to keep any leftover food item 2 not able to be cut by the blade 7 secured with the weight 120 for easy removal of the leftover from the food slicer 10. It can be appreciated that once the food item 2 that is aligned with the food item bore 5 is no longer capable of being sliced by the blade 7, the coupler motor 8 can be activated to rotate the food slicer 10 so that the next food item 2 is position for slicing.

After slicing the food item 2, the food slicer 10 can be configured to lay or dispense the sliced food item on another food item such as, but not limited to a pizza dough or crust, a bun, a slide of bread, a tortilla, a taco shell, and the like.

A user can grasp any of the handles 42 and lift the food slicer 10, with or without the coupler 60, from the surface 4 or out from a machine. The lifting operation would slide the frame 12 up along the tracks 80 until the central ring 32 of the upper member 30 contacts the track support 90. At this time, continued lifting of the frame 12 would remove the entire food slicer 10 for cleaning.

To dissemble the food slicer 10, the weight guides 100 and assembled weights 120 may be slid out of their corresponding track channels 82 and out an open end of the tracks 80. Then the fasteners 88 would be removed from the hub 50 and/or the track support 90. This would allow the frame 12 to slide out from the radially arranged tracks 80, and for cleaning, where the fasteners 44 can be removed to disassemble the frame 12. Once all the fasteners 88 have been removed, the tracks 80 can be cleaned.

The weights 120 can be separated from their corresponding weight guide 100 by laterally pulling the weight guide 100 and weight 120.

To assemble the food slicer 10, the tracks 80 can be secured to the hub 50 utilizing fasteners 88. The frame 12 can be assembled and the central ring 32 can be inserted into the interior of the radially arranged tracks 80 so that each of the tracks 80 is slidable received in a corresponding track opening 20 of the base 14. After which, the support ring 92 of the track support 90 can be inserted into the interior of the radially arranged tracks 80, and the tracks 80 secured to each of the flanged end bores 98 by way of the fasteners 88.

An end of a new food item 2 can be inserted into the open area 134 of the weight 120 until it is impaled by the piercing elements 132. After which, the weight 120 can be inserted into the open space between the clamp 14*m* 104 and the locking arm 110 until the protrusion 124 is snapped into the first opening 106 and the latch 112 is engaged with the locking ledge 128. This action further inserts the piercing end 116 into a side of the new food item 2 opposite the piercing elements 132.

The assembled weight guide 100, weight 120 and new food item 2 can be slid into the track channel 82 by inserting the follower 102 into the track channel 82.

After which, the frame 12 can be lifted and the food slicer 10 can be placed back into operational position.

In an exemplary operation without limiting the scope of the present technology, the food slicer 10 can be configured to provide a sliced food item 2', such as pepperoni, to a food preparation machine that dispenses the sliced food item on a pizza dough or other type of food. Further in the exemplary, the food slicer 10 can be utilized with or in a food preparation machine such as, but not limited to, an automated pizza making machine. In an embodiment, the food slicer 10 can be a module unit configured to be placed in different locations in a food preparation machine, and can include modular components for repair and/or upgrading to other components. In the exemplary, the food slicer 10 can be removably received in an automatic food processing machine, and can be configured to slice and dispense the food item 2 on to a food article, for example but not limited to, a pizza crust supported below the food slicer 10.

The food slicer 10 can be utilized and operated independently of a machine or automated food processing machine.

It can be appreciated that the food slicer 10 can be a module configured to be placed in different locations in a food preparation machine, and can include modular components for repair and/or upgrading to other components.

Rotation of the food slicer 10 allows the feeding of a food item 2 on the blade 7. In the exemplary, slices 2' of the food item 2 can fall down onto a pizza crust. A passing sensor (not shown) can be utilized and configured to detect a pass of the food item slice 2'. Computer vision can be utilized and configured to check the even spreading of the slices 2' on the pizza crust.

In an embodiment, the food slicer 10 can be rotated simultaneously with rotation of the blade 7.

In an embodiment, the blade 7 and blade motor 6 can be vertically adjusted to adjust the thickness of the sliced food item 2'.

In an embodiment, after refilling the weight 120 with a new food item 2, a large cut of a bottom section of the food item 2 can be carried out to level an end surface of the food item 2. This could be associated with a setup operation that provides a clean portion of the food item 2 that is sized equal to most of the remaining portion of the food item 2. This provides evenly thick slices 2' to be obtained from the remaining portion of the food item 2. This setup operation further assists to setup slice thickness for different types of food items 2.

In an embodiment, continuous rotation of the food slicer 10 and thus the food item 2 allows for pressing the food item 2 against the blade 7, thereby slicing the food item 2 to a predetermined thickness dependent on the vertical location of the blade 7. The weight 120 ensures that the food item 2 is always forced downward toward the blade 7 and thus always in a proper position for slicing by the blade 7 when that particular assembled track 80, weight guide 100 and weight 120 is rotated over the food item bore 5.

In an embodiment, a slicer nozzle or spreader (not shown) can be positioned below the blade 7 and below the food item bore 5 to receive the sliced food item 2'. The slicer spreader can include ledges, tracks, bores and/or grooves that are angled to create pivot points for the sliced food item 2' so that it properly lands on a surface or food therebelow.

In some embodiments, the food slicer 10 can be configured to operate in response to control signals providing by a computer system including at least one processing unit operably connected or connectable to a food preparation machine and/or to one or more sensors. The signals can correspond to the weight or other characteristics of the material, for example as detected by a weight/scale sensor (not shown), and then to vary the dispensing according to control signal.

According to one aspect, the present technology can include a food item delivering device 10 for providing a food item 2 to the blade 7. The food item delivering device 10 can include one or more tracks 80, and a weight 120 slidable along the tracks 80. The food item 2 can be in contact with the weight 120 for advancing the food item 2 toward the blade 7.

According to another aspect, the present technology can include a food slicer 10 for slicing a food item 2 by the blade 7. The food slicer 10 can include a plurality of tracks 80, a weight 120, a hub 50, and a frame 12. The plurality of tracks 80 can each include a track channel 82 define along a longitudinal length of the tracks 80. The weight 120 advances the food item 2 toward the blade 7, with the food item 2 being secured to the weight 120. The hub 50 can have each of the tracks 80 attachable thereto to form a radial arrangement of the tracks 80 with the hub 50 located interior thereof. The frame 12 can be slidable along the tracks 80. The frame 12 can include a base 14 and an upper member 30. The base 14 can include base bores 16 defined therethrough so that each of the base bores 16 is aligned with at least one of the tracks 80. The upper member 30 can include upper arms 36 extending out from a central ring 32 in a radial arrangement so that each of the upper arms 36 extends out from between the tracks 80 adjacent to each other.

According to yet another aspect, the present technology can include a food slicer system 10 for slicing a food item 2. The food slicer system 10 can include a plurality of tracks 80, the blade 7, a weight 120, a hub 50 and a frame 12. The plurality of tracks 80 can each include a track channel 82 defined along a longitudinal length of the tracks 80. The weight 120 can have the food item 2 secured thereto, and the weight 120 can advance the food item 2 toward the blade 7. The hub 50 can have each of the tracks 80 attachable thereto to form a radial arrangement of the tracks 80 with the hub 50 located interior thereof. The frame 12 can be slidable along the tracks 80. The frame 12 can include a base 14 and an upper member 30. The base 14 can include base bores 16 defined therethrough so that each of the base bores 16 is aligned with at least one of the tracks 80. The upper member 30 can include upper arms 36 extending out from a central ring 32 in a radial arrangement so that each of the upper arms 36 extends out from between the tracks 80 adjacent to each other.

According to still yet another aspect, the present technology can include a method of operating a food item delivering device 10 for providing a food item 2 to the blade 7. The food item delivering device 10 can include one or more tracks 80, and a weight 120. The method can include the steps of securing the food item 2 to the weight 120. Sliding the weight 120 and the food item 2 along one of the tracks 80 so that the weight 120 advances the food item 2 toward the blade 7. Slicing a section 2' of the food item 2 by the blade 7.

Some embodiments of the present technology can include a weight guide 100 engageable with the weight 120. The weight guide 100 can include a follower 102 slidable received in a track channel 82 defined along a longitudinal length of the tracks 80.

In some embodiments, the weight guide 100 can include a clamp arm 104 including a first opening 106 releasably engageable with a protrusion 124 extending from the weight 120.

In some embodiments, the weight guide 100 can include a locking arm 110 including a latch 112 engageable with a ledge 128 of the weight 120.

In some embodiments, the weight guide 100 can include a piercing arm 114 including a piercing end 116 configured to pierce into the food item 2.

In some embodiments, the weight 120 can include a locking recess 126 defined in the weight 120 and configured to receive the locking arm 110. The ledge 128 can be adjacent to the locking recess 126.

In some embodiments, the weight 120 can include one or more piercing sections 130 extending from the weight 120. The piercing sections 130 can include a piercing element 132 configured to pierce into the food item 2.

Some embodiments of the present technology can include a track support 90 including a plurality of support arms 96. The tracks 80 can be a plurality of tracks secured to the track support 90 in a radial arrangement.

Some embodiments of the present technology can include a hub 50. The tracks 80 can be a plurality of tracks secured to the hub 50 in a radial arrangement.

Some embodiments of the present technology can include a coupler 60.

In some embodiments, the coupler 60 can include a tapered body 64.

In some embodiments, the tapered body 64 can include coupler teeth 66.

In some embodiments, the hub 50 can include a tapered bore 52 defined therein including hub teeth 54. The tapered body 64 of the coupler 60 can be receivable in the tapered bore 52 of the hub 50 so that the coupler teeth 66 and the hub teeth 54 are engageable.

Some embodiments of the present technology can include a frame 12 slidable associated with the tracks 80.

In some embodiments, the frame 12 can include a base 14 including base bores 16 defined through the base 14 in a radial arrangement so that each of the base bores 16 is aligned with at least one of the tracks 80. The base bores can be configured to receive the food item 2 therethrough.

In some embodiments, the frame 12 can include an upper member 30 including upper arms 36 extending out from a central ring 32 in a radial arrangement so that each of the upper arms 36 extends out from between the tracks 80 adjacent to each other.

In some embodiments, the frame 12 can include a handle 42 attachable to one or more of the upper arms 36 and the base 14.

In some embodiments, the base 14 can include one or more guide ramps 18 extending into the base bores 16. The guide ramps 18 can be configured to guide the food item 2 through the base bores 16.

In some embodiments, the base bores 16 can be configured to receive the weight 120 therethrough.

In some embodiments, the base 14 can include a base central bore 22 defined therethrough that is configured to receive the hub 50.

In some embodiments, the frame 12 can be configured to slide along the tracks 80.

While embodiments of the food slicer device, system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although slicing a food item have been described, it should be appreciated that the food slicer herein described can also be suitable for positing an item for slicing by a blade.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A food item delivering device for providing a food item to a blade, the food item delivering device comprising:
- one or more tracks;
- a weight slidable along the tracks, the food item is in contact with the weight for advancing the food item toward the blade; and
  - a weight guide engageable with the weight, the weight guide including a follower slidable received in a track channel defined along a longitudinal length of the tracks.

2. The food item delivering device according to claim 1, wherein the weight guide comprises:
- a clamp arm including a first opening releasably engageable with a protrusion extending from the weight;
- a locking arm including a latch engageable with a ledge of the weight; and
- a piercing arm including a piercing end configured to pierce into the food item.

3. The food item delivering device according to claim 2, wherein the weight comprises:
- a locking recess defined in the weight and configured to receive the locking arm, wherein the ledge is adjacent to the locking recess; and
- one or more piercing sections extending from the weight, the piercing sections including a piercing element configured to pierce into the food item.

4. A food item delivering device for providing a food item to a blade, the food item delivering device comprising:
- one or more tracks;
- a weight slidable along the tracks, the food item is in contact with the weight for advancing the food item toward the blade; and a track support including a plurality of support arms, wherein the tracks is a plurality of tracks secured to the track support in a radial arrangement.

5. A food item delivering device for providing a food item to a blade, the food item delivering device comprising:
- one or more tracks;
- a weight slidable along the tracks, the food item is in contact with the weight for advancing the food item toward the blade;

a hub, wherein the tracks is a plurality of tracks secured to the hub in a radial arrangement; and a coupler including a tapered body including coupler teeth, wherein the hub includes a tapered bore defined therein including hub teeth, and wherein the tapered body of the coupler is receivable in the tapered bore of the hub so that the coupler teeth and the hub teeth are engageable.

6. A food item delivering device for providing a food item to a blade, the food item delivering device comprising:

one or more tracks;

a weight slidable along the tracks, the food item is in contact with the weight for advancing the food item toward the blade; and a frame slidable associated with the tracks; and wherein the frame comprises:

a base including base bores defined through the base in a radial arrangement so that each of the base bores is aligned with at least one of the tracks, the base bores being configured receive the food item therethrough;

an upper member including upper arms extending out from a central ring in a radial arrangement so that each of the upper arms extends out from between the tracks adjacent to each other; and a handle attachable to one or more of the upper arms and the base.

7. The food item delivering device according to claim 6, wherein the base includes one or more guide ramps extending into the base bores, the guide ramps are configured to guide the food item through the base bores.

8. The food item delivering device according to claim 6, wherein the base bores are configured to receive the weight therethrough.

9. The food item delivering device according to claim 6 further comprising a hub, wherein the tracks are secured to the hub in a radial arrangement, and wherein the base include a base central bore defined therethrough that is configured to receive the hub.

10. The food item delivering device according to claim 6, wherein the frame is configured to slide along the tracks.

11. A food slicer for slicing a food item by a blade, the food slicer comprising:

a plurality of tracks each including a track channel define along a longitudinal length of the tracks;

a weight, wherein the food item is secured to the weight, and wherein the weight advances the food item toward the blade;

a hub, each of the tracks being attachable to the hub to form a radial arrangement of the tracks with the hub located interior thereof; and a frame slidable along the tracks, the frame includes a base and an upper member, wherein the base including base bores defined therethrough so that each of the base bores is aligned with at least one of the tracks, and wherein the upper member including upper arms extending out from a central ring in a radial arrangement so that each of the upper arms extends out from between the tracks adjacent to each other.

12. The food slicer according to claim 11 further comprising a weight guide engageable with the weight, the weight guide including a follower slidable received in the track channel defined along the longitudinal length of the tracks.

13. The food slicer according to claim 12, wherein the weight guide comprising:

a clamp arm including a first opening releasably engageable with a protrusion extending from the weight;

a locking arm including a latch engageable with a ledge of the weight; and a piercing arm including a piercing end configured to pierce into the food item.

14. The food slicer according to claim 13, wherein the weight comprising:

a locking recess defined in the weight and configured to receive the locking arm, wherein the ledge is adjacent to the locking recess; and one or more piercing sections extending from the weight, the piercing sections including a piercing element configured to pierce into the food item.

15. The food slicer according to claim 11 further comprising a coupler including a tapered body including coupler teeth, wherein the hub includes a tapered bore defined therein including hub teeth, and wherein the tapered body of the coupler is receivable in the tapered bore of the hub so that the coupler teeth and the hub teeth are engageable.

16. The food slicer according to claim 11, wherein the base includes one or more guide ramps extending into the base bores, the guide ramps are configured to guide the food item through the base bores.

17. A food slicer system for slicing a food item, the food slicer system comprising:

a plurality of tracks each including a track channel defined along a longitudinal length of the tracks;

a blade;

a weight, the food item being secured to the weight, wherein the weight advances the food item toward the blade;

a hub, each of the tracks being attachable to the hub to form a radial arrangement of the tracks with the hub located interior thereof; and a frame slidable along the tracks, the frame includes a base and an upper member, wherein the base including base bores defined therethrough so that each of the base bores is aligned with at least one of the tracks, and wherein the upper member including upper arms extending out from a central ring in a radial arrangement so that each of the upper arms extends out from between the tracks adjacent to each other.

18. The food slicer system according to claim 17, wherein the blade is a rotating blade.

* * * * *